April 9, 1968

M. HETZEL 3,376,786

MACHINE FOR CUTTING TOOTHED WHEELS

Filed Dec. 14, 1965

April 9, 1968        M. HETZEL        3,376,786

MACHINE FOR CUTTING TOOTHED WHEELS

Filed Dec. 14, 1965        5 Sheets-Sheet 2

April 9, 1968     M. HETZEL     3,376,786
MACHINE FOR CUTTING TOOTHED WHEELS
Filed Dec. 14, 1965     5 Sheets-Sheet 4
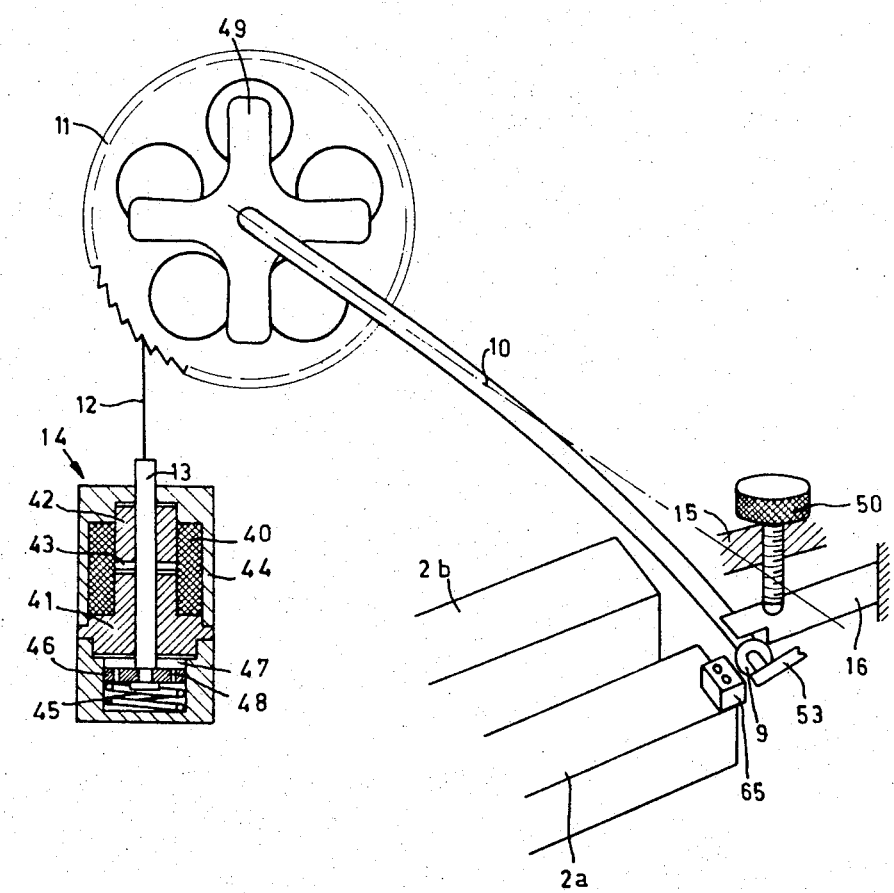

United States Patent Office 3,376,786
Patented Apr. 9, 1968

3,376,786
MACHINE FOR CUTTING TOOTHED WHEELS
Max Hetzel, Bienne, Switzerland, assignor to Centre Electronique Horloger S.A., a company of Switzerland
Filed Dec. 14, 1965, Ser. No. 513,792
Claims priority, application Switzerland, Jan. 26, 1965, 1,073/65
7 Claims. (Cl. 90—1)

ABSTRACT OF THE DISCLOSURE

In a machine for cutting teeth in a wheel, electronic driving means drive an oscillator and a cutting tool is mounted on the oscillator for oscillating therewith, the oscillator is adapted to oscillate with an oscillation in a first direction which corresponds to cutting of the wheel by the tool and is further adapted to oscillate with a second oscillation in a second direction which corresponds to the penetration of the wheel by the cutting tool.

---

This invention is concerned with a machine for cutting toothed wheels, particularly small wheels such as those employed in the watch making industry.

Cutting machines presently used are rotating machines, the cutting tool consisting generally of a diamond being driven by a shaft turning in bearings. The assembly has a certain play which is necessary for the moving of the rotating pieces with respect to the fixed pieces on which they are supported. Despite all the care and the precision used in making machines of this type, it is practically impossible to cut, for example, a ratchet such as that used in certain electronic watches having 360 teeth and a depth of 0.02 mm. with sufficient precision because the play of the different moving members causes the shaft to oscillate thereby causing disturbing vibrations extending to the entire machine.

The object of the present invention is to provide a machine which does not employ bearings and shafts, that is to say without rotating members and which uses the force causing disturbances in present day machines, vibrations, to effect the cutting.

The automatic machine for cutting small toothed wheels according to the invention, is characterized by the fact that the movement and the advance of the cutting tool are brought about by a mechanical oscillator the oscillation of which is maintained by electronic means.

The accompanying drawings, show by way of example, one embodiment of the present invention.

Figure 1:
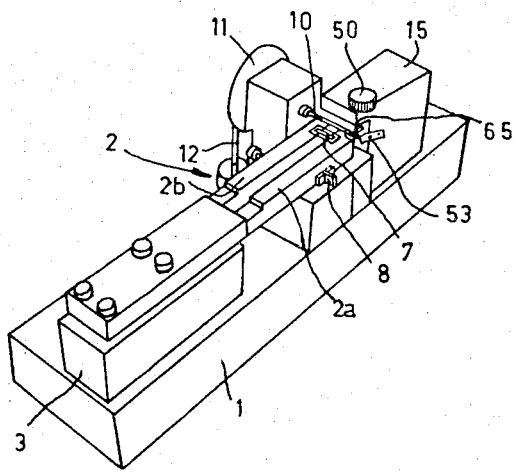
Figure 6:
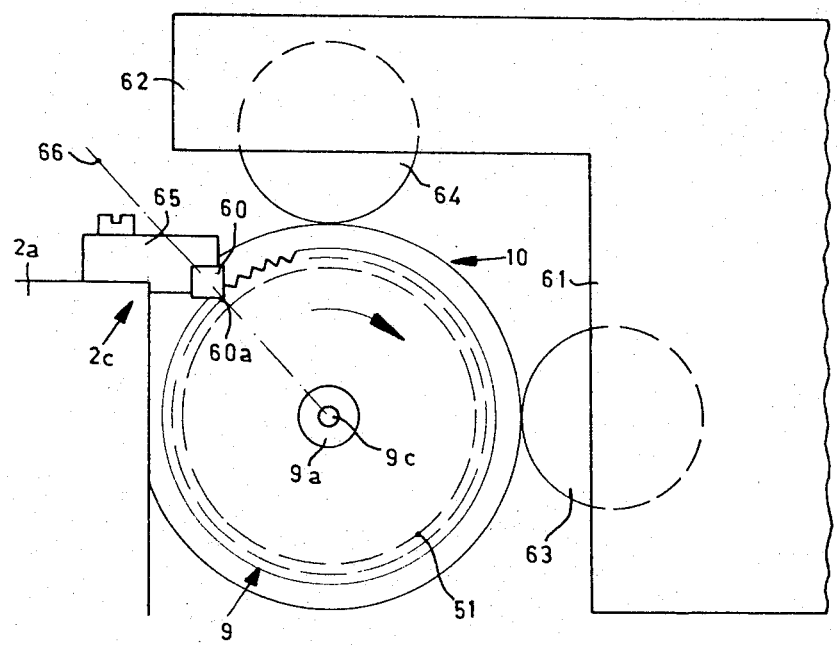
Figure 2:
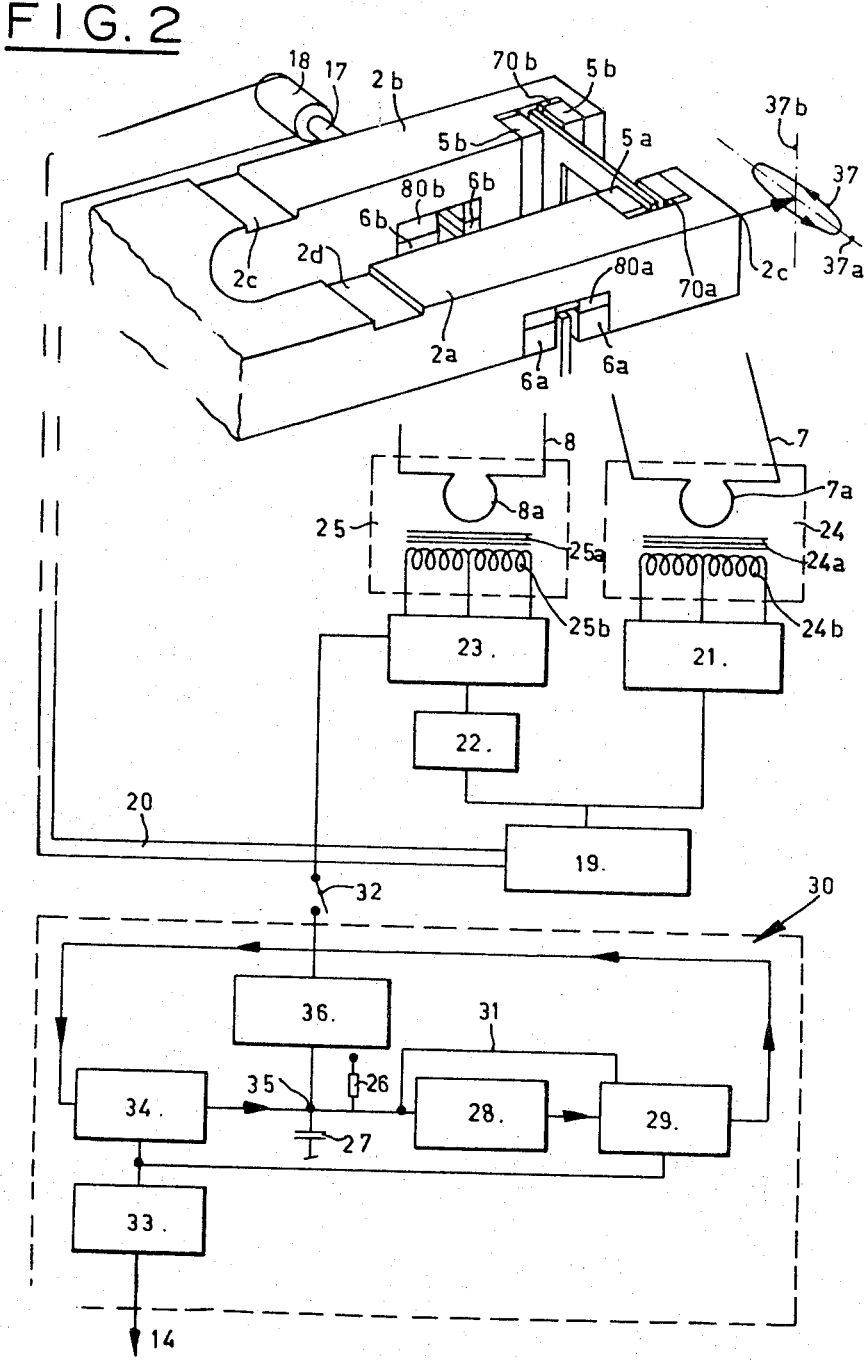
Figure 3A:
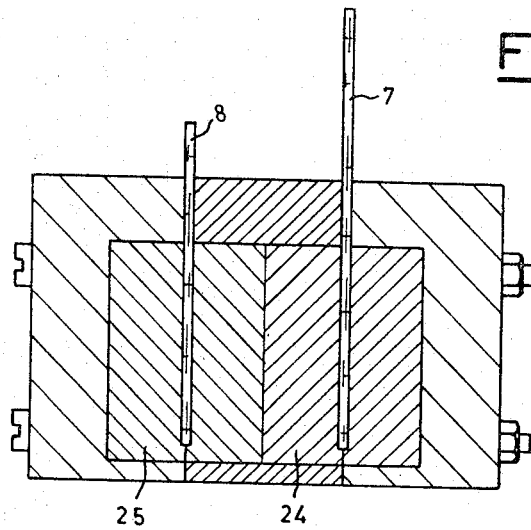
Figure 3B:
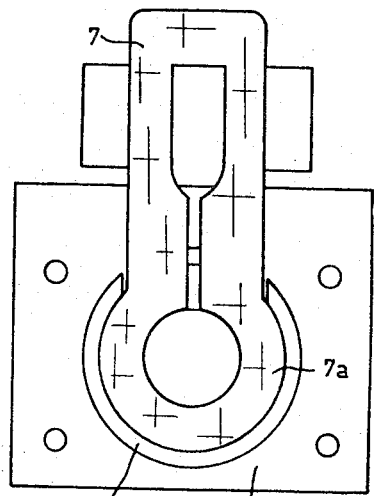
Figure 3C:
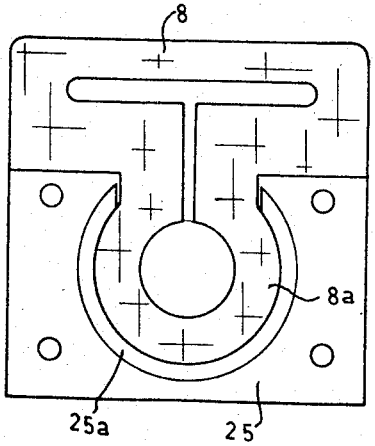
Figure 5:
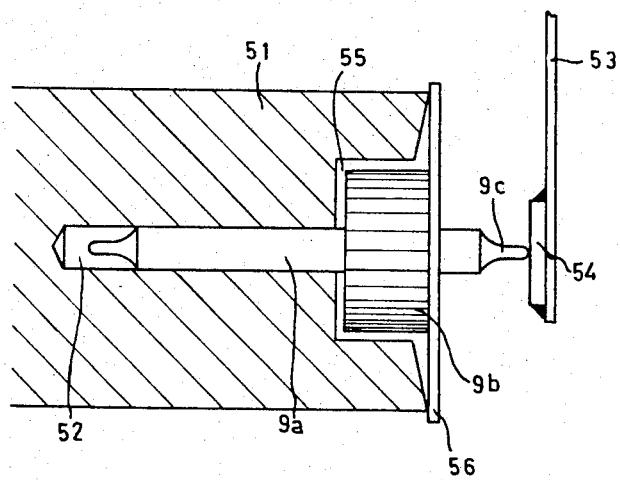
Figure 7:
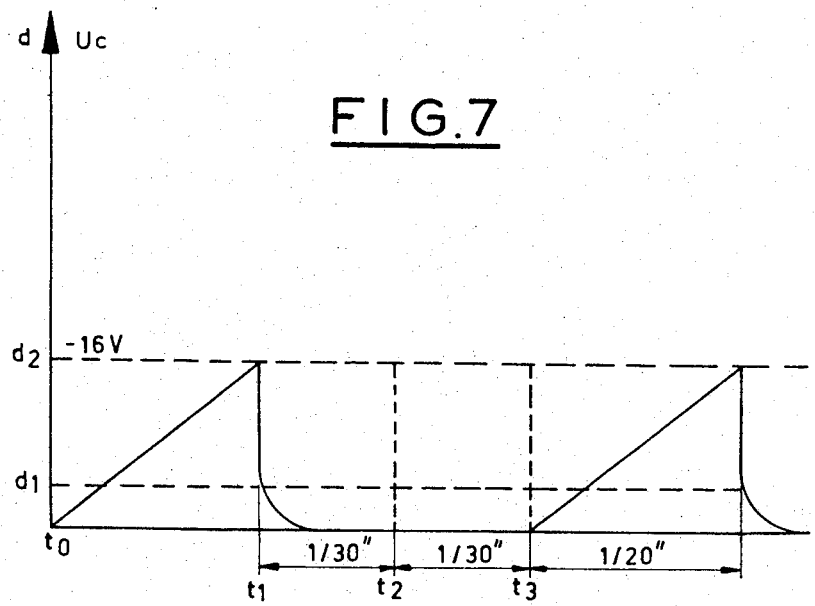

FIGURE 1 shows a perspective view of the machine;
FIGURE 2 shows a schematic diagram including the electronic control circuit;
FIGURES 3a, 3b and 3c are detailed views showing the electro-dynamic oscillation maintaining coils;
FIGURE 4 shows the support for the wheel to be cut;
FIGURE 5 shows a cross-sectional view of the wheel to be cut;
FIGURE 6 shows a front view of the wheel to be cut;
FIGURE 7 shows a cut diagram.

The machine consists essentially of a base 1 which is very heavy and very rigid with respect to the mass of the tool and of the wheel to be cut. A mechanical oscillator consisting of a tuning fork 2 is secured by four screws on a base 3 borne by the base 1. Branch 2a of the tuning fork bears cutting tool 4 at its end 2c, while branch 2b merely dynamically balances the oscillating system. Two magnet systems 5a and 6a, and 5b and 6b respectively are secured in each of branches 2a and 2b and cooperate respectively with a coil 7 and 8 to maintain the oscillation of the tuning fork. The polarity of the magnet is such that branches 2a and 2b can oscillate in counter phase in a horizontal plane as well as parallel to a vertical plane, as will be described later in detail.

Energizing coils 7 and 8 comprise a single winding consisting of a cut copper plate. They are shown in detail on FIGURE 3 where can also be seen transformers 24 and 25 which are known under the name of ferroxcubes and which comprise an armature and a rigid iron core 24a and 25a respectively which pass through each of the coils formed by the portions 7a and 8a of windings 7 and 8 forming the secondary winding of the transformers.

The wheel 9 to be cut is secured at the end of a steel rod 10 which prolongs the axis of toothed wheel 11 which is the replica of the wheel to be cut and for that reason has the number of teeth that one wishes to cut. This wheel is braked but can turn by the action of very hard tempered steel rod 12 unitary with piston 13 electromagnetically controlled by device 14. This device is shown in detail of FIGURE 4. Block 15 and rod 16 form a very rigid assembly serving to maintain the wheel to be cut absolutely fixed as will be described later in connection with FIGURES 4, 5 and 6.

Branch 2b also bears on its external lateral surface a magnetized bar 17 sitting in a coil 18 as a pick-up coil in order to maintain oscillation in known manner.

FIGURE 2 shows the electrical circuit for the maintenance and the control of the tuning fork oscillations. The tuning fork 2 is again shown schematically in the branches 2a and 2b of which are mounted the pairs of magnetized bars 5a and 5b, 6a and 6b. The space between the magnetized bars and the bottom of the mounting slots is filled by a brass mass 70a, 70b, 80a and 80b in order to increase the rigidity of the assembly. The portions 7a and 8a of coils 7 and 8 which cooperate with the magnetized bars form the secondary windings of the two ferrox-cubes transformers 24 and 25. The primary winding 24b and 25b of these transformers is linked to the terminals of the power amplifier 21 and 23 respectively, both receiving a pre-amplified voltage from a pre-amplifier 19 linked by cable 20 to pick-up coil 18. In order that the output voltage of the two amplifiers be out of phase by 90° with respect to one another, a dephasing circuit 22 is inserted between amplifier 23 and pre-amplifier 19. Amplifier 21 is fed by a direct voltage source of 22 v., while amplifier 23 is fed by a variable voltage coming from the cutting control circuit 30.

Circuit 30 comprises an RC member consisting of resistance 26 in series with capacitor 27 connected between a direct current source at −50 v. and earth. The time constant of member RC is calculated in such a way as to obtain an exponential charging curve increasing from 0 to −16 v. in 1/20 of a second. The connecting point 35 of capacitor 27 and resistance 26 is linked to a threshold circuit 28 delivering a signal when its voltage reaches −16 v., this signal operating a first monostable relay 29 which delivers an impulse during 1/30 of a second and abruptly discharging the capacitor through the link 31 and maintaining it discharged during this impulse, at the end of which the rear flank of the impulse triggers a second identical monostable relay 34 which maintains capacitor 27 discharged during a second period of 1/30 of a second. Point 35 is linked also to direct current power amplifier 36 serving as the variable voltage source feeding amplifier 23. The signal of relay 29 is also applied to a power amplifier 33 controlling the electrodynamic feed device 14.

The machine functions as follows:

The tuning fork being at rest and the circuits under a voltage, the vibration of the tuning fork is provoked either by a slight direct shock or indirectly by an auxiliary vibration and the branches 2a and 2b vibrate naturally out of phase in a horizontal plane. The frequency of horizontal oscillation of the tuning fork is of 700 c.p.s. The pick-up coil is then passed by a variable flux of 700 c.p.s. Voltage in this coil is transmitted to pre-amplifier 19 which amplifies it and distributes it to the two power amplifiers 21 and 23. The circuit voltage of amplifier 21 feeds through transformer 24 the copper coil 7 having a very low impedance through which passes an alternating current.

The output voltage of pre-amplifier 22 is fed, after a dephasing of 90° with respect to the voltage applied to amplifier 21, to amplifier 23, which when switch 32 is open does not deliver any output voltage. When switch 32 is closed, a saw tooth feed voltage is applied to amplifier 23. Coil 8 is then passed through by an alternating current having a variable amplitude at 700 c.p.s. It should be noted that magnetic circuits 6a and 6b are opposed so that when branch 2a is attracted downwardly, branch 2b is pushed upwardly. The two branches oscillate in opposite phase in two parallel vertical planes so that the oscillating system is also dynamically balanced vertically. The superimposition of horizontal and vertical oscillations, out of phase by 90°, drive the branches of the tuning fork in elliptical trajectories as is well known. The saw tooth feed current is produced by the progressive charge and the abrupt discharge of capacitor 27. The capacitor is charged through resistance 26. As the voltage at point 35 increases, the feed voltage of amplifier 23 increases also and consequently so do the vertical oscillations of the tuning fork. The vertical diameter 37b of ellipse 37 described by the branches increase progressively to attain a first intermediate value at which the diamond fixed to end 2c contact the periphery of the wheel to be cut, then the cutting of the wheel begins, the diamond penetrating at each passage more deeply into the wheel until the desired depth of a tooth is reached, corresponding to a voltage of −16 v. at point 35, a voltage which triggers threshold circuit 28 which in turn triggers relay 29 occasioning the abrupt discharge of capacitor 27 through link 31. The voltage at point 35 falls to a very small value and the vertical oscillation of the tuning fork ceases. The condenser is now discharged for $1/15$ of a second by relays 29 and 34. This pause is used to bring about the automatic advance of the wheel to be cut. To this effect, the $1/30$ of a second signal issuing from relay 29 triggers the advance device 14 which at the end of $1/10$ of a second drives wheel 11 by releasing the piston 13. The vertical oscillation of the tuning fork must be completely dampened at the end of $1/30$ of a second. It is necessary to indicate that the vertical oscillation frequency of 700 c.p.s. must not coincide with the resonance frequency of each of the vertically oscillating branches of the tuning fork. The ideal is that the 700 c.p.s. be as far as possible from the resonance, that is to say that there be a dephasing of 90° with respect to the resonance. But the force necessary to drive the branches would have to be very great which would excessively heat the copper winding 8. It is necessary then to compromise between the dephasing of 90° and the maximum force permissible. The intermediate dephasing can be adjusted by filing more or less the branches 2a and 2b at the spots 2d and 2c. The dampening of the vertical oscillations is however rapid enough so that there is no danger of driving the wheel to be cut too soon. The second relay 34 introduces a second pause of $1/30$ of a second succeeding immediately the first in order to enable rod 12 of the advance device 14 to reach the end of its course whereupon relay 34 returns to its rest position enabling capacitor 27 to become recharged through resistance 26 and the procedure is repeated for each tooth cut.

The device controlling the advance is shown on FIGURE 4. The device 14 comprises a piston 13 bearing rod 12 made of hardened tempered steel, a coil 40 surrounding a soft iron core composed of two parts of which one 41, is fixed to the base, and the other 42, is fixed to the rod 13 and can move therewith in the opening of the coil. The external magnetic circuit is formed by a socket made of soft iron 44 secured to core 41, an air gap 43 being provided between core 41 and 42 and kept open by spring 45 acting on piston 46. The motion of the piston 46 is braked by an oil bath 47, the oil dripping through the piston through various holes 48. When the device receives from power amplifier 33 the $1/30$ of a second current impulse, core 42 is attracted by core 41 compressing spring 45. At the end of $1/30$ of a second, thus during the impulse of the second relay 34, the spring unwinds pushing back piston 46. It is thus not electromagnetic energy which makes rod 12 advance but the energy of spring 45. The force with which piston 13 is pushed back is only limited by the mechanical resistance of device 14, in such a way that this force can be very great and so as to actuate the rod in a very short time despite the resistance of the oil. The spring action is practically continuous and the rod drives toothed wheel 11 with a uniform and flexible push which does not risk damaging the teeth.

Wheel 11 is braked by a cruciform spring 49, of which the branches bear on the surfaces of the wheel 11. The latter has a sufficient diameter so that there may be cut therein by a classical procedure a large number of teeth with great relative precision such as 240 teeth. The wheel is cut away so that its moment of inertia be as small as possible. Its axis is prolonged by cylindrical steel rod 10 at the end of which is secured the wheel 9 to be cut. The end of this rod 10 is perfectly cylindrical and is maintained in a slightly bent position under the pressure of rod 16. The position of rod 16 is longitudinally adjustable by a screw (not shown) and laterally by screw 50 exerting pressure on the overhanging extremity of the rod and deforming it elastically.

The details of the securing of the wheel to be cut and of the adjustment of this position are shown in FIGURES 5 and 6.

FIGURE 5 shows a cross-section of the end of the rod 10, the diameter of which is slightly less than the diameter of the wheel 9 to be cut. The latter is secured with its axle 9a which fits exactly in a bore 52 of the same diameter of the axle and is perfectly coaxial to rod 10. Wheel 9 is axially maintained by spring 53, pivoted on base 15 and provided at its end with a ruby plate 54 bearing on pivot 9c of the axle. A space 55 is provided in order to eventually receive pinion 9b of the wheel to be cut. The end 51 of the rod 10 is machined along a conical or concave surface in such a way that wheel 9 rests only on a perfectly plane circular edge 56.

FIGURE 6 shows the same assembly viewed from the front, without spring 53. There may be recognised at the end 2c of branch 2a of the tuning fork the cutting tool. The latter is formed by a diamond 60 glued preferably with araldite to a small support 65 itself secured on the tuning fork. The support 65 is made as light as possible so as not to unbalance the tuning fork, but it is evident that it must be perfectly rigid. In the present example, the teeth have flanks inclined at 45°, in such a way that the diamond has an angle of 90°, the bisector 66 of this angle passing through the axis of the wheel to be cut. As indicated above, the position of wheel 9 is maintained laterally by rod 16. The latter bears on rod 10 by two balls 63 and 64 made of hardened polished steel or rubies lodged in the two angles faces 61 and 62, the contact points of which with rod 10 are located respectively on a horizontal and vertical line passing by the axis of the wheel. The surface of rod 10 is exactly concentric with the axis of opening 52 and is (FIGURE 5) itself hardened in such a way that the rubbing and the wear at the point of contact with the balls is reduced to a minimum. In the example shown, the wheel receives 240 teeth having a depth of 0.014 mm. and a length of 0.02 mm. The diameter of the wheel is 1.5 mm. and its thickness is 0.03 mm.

On FIGURE 7 is shown a control diagram of the machine which is also a graph of the cutting. On the ordinate is given the voltage Uc (FIGURE 2) and, also the advance of diamond d, and on the abcissa is given the time t. The origin $t_0$ is selected arbitrarily at the beginning of the charge of capacitor 27. The latter charges progressively until voltage −16 v., then discharges abruptly. The duration of this saw tooth impulse is of $\frac{1}{20}$ of a second. In parallel fashion, the cutting diamond nears the tooth to be cut and reaches after moving a distance $d_1$ which can vary with imperfections in the uncut wheel; from $d_1$ to $d_2$ the diamond cuts the tooth and abruptly moves back at time $t_1$. At this moment, relays 29 controls by a $\frac{1}{30}$ of a second impulse the recoil of rod 12 which drives wheel 11 during a time ranging between $t_2$ and $t_3$ equal to $\frac{1}{30}$ of a second. Relay 34 removes the short circuit from capacitor 27 which discharges again to control the cutting of a new tooth.

This machine cuts extremely rapidly and accurately. In known machines, the limit of the cutting rate is not determined by the diamond for which the limit is not known but by the vibrations of the machine increasing with the speed of rotation of the shaft. However, here the control vibrations of the machine are used. The cutting rate is here determined by the resistance of the steel of which the tuning fork is composed. It is easily realised that mechanical tension occurring at the centre of oscillation can reach critical values when the tuning fork is oscillated at the high frequency and a relatively great amplitude, causing considerable acceleration in the moving masses.

The machine is not limited to the embodiment described. The branches of the tuning fork can also oscillate in phase. The reaction on the support would then be considerable, the oscillating system no longer being dynamically balanced.

In the place of an electrodynamic system, an electromagnetic system more powerful could be used but this might lead to overheating.

What is claimed is:
1. A machine for cutting teeth in a wheel comprising:
 (i) a frame,
 (ii) a mechanical oscillator mounted on the frame,
 (iii) electronic driving means connected to the oscillator and adapted to drive the oscillator,
 (iv) and a cutting tool mounted on the oscillator for oscillation with the oscillator,
 (v) the oscillator being adapted to oscillate with a first oscillation in a first direction corresponding to cutting of the wheel by the tool,
 (vi) and being further adapted to oscillate with a second oscillation in a second direction corresponding to penetration of the wheel by the tool.

2. A machine according to claim 1, characterised by the fact that said oscillator comprises a tuning fork having two branches, and that the tool is mounted on one of the branches.

3. A machine according to claim 2, characterised by the fact that the tuning fork has a plane of symmetry, said first direction being perpendicular to the plane of symmetry, and said second direction being parallel to the plane of symmetry, the branches being adapted to oscillate in the first direction in counter phase at a given frequency and with a given amplitude, the branches being adapted to oscillate in the second direction also in counter phase and at the same frequency but out of phase by 90° with respect to said given frequency, the amplitude of said second oscillation varying progressively from zero to a given value in order to abruptly fall to zero under the control of said electronic driving means, the two oscillations being superimposed to drive the branches along an elliptical trajectory of which the major axis corresponds to the amplitude of the first oscillation, and the variable minor axis corresponds to the variable amplitude of the second oscillation.

4. A machine according to claim 3, characterised by the fact that the cutting tool is secured at the end of one of the branches of the tuning fork, and that the major axis of the ellipse described by the tool is perpendicular to the plane of the wheel to be cut, the minor axis being approximately located in the same plane as the wheel.

5. A machine according to claim 4, characterised by the fact that
 (i) each of the branches of the tuning fork is provided with a first magnetic system, each first magnetic system comprising:
  (a) a magnetic circuit,
  (b) an air gap,
  (c) and a first coil common to the two first systems and transversing each of the air gaps,
 (ii) the two first magnetic systems being geometrically homologous and having their magnetic circuits disposed in the same sense,
 (iii) the two first systems being adapted to maintain the first oscillation,
 (iv) and each of the branches is provided with a second magnetic system, each second magnetic system comprising:
  (a) a magnetic circuit,
  (b) an air gap,
  (c) and a second coil common to the two second systems and transversing each of the air gaps
 (v) the two second magnetic systems being geometrically homologous and having their magnetic circuits disposed in opposite senses,
 (vi) the two second systems being adapted to maintain the second oscillation.

6. A machine according to claim 5, characterised by the fact that one of the branches bears a magnet acting on a pick-up coil linked to an amplifier circuit for feeding said first and second maintenance coils.

7. A machine according to claim 3, characterised by the fact that the frequency of the first oscillation corresponds to the resonance frequency of the tuning fork, while the second oscillation is a forced oscillation, the frequency of which differs from the resonance frequency sufficiently to allow the second oscillation to decay very rapidly when said electronic driving means stop driving the second oscillation.

References Cited
UNITED STATES PATENTS
2,834,158  5/1958  Peterman _____ 51—59

GERALD A. DOST, *Primary Examiner.*